(12) United States Patent
Wang

(10) Patent No.: US 12,638,037 B2

(45) Date of Patent: May 26, 2026

---

(54) EXPANDABLE ANCHORING DEVICE

(71) Applicant: YOKE INDUSTRIAL CORP., Taichung City (TW)

(72) Inventor: Chia-Hsien Wang, Taichung City (TW)

(73) Assignee: YOKE INDUSTRIAL CORP., Taichung City (TW)

( * ) Notice: Subject to any disclaimer, the term of this patent is extended or adjusted under 35 U.S.C. 154(b) by 510 days.

(21) Appl. No.: 18/458,170

(22) Filed: Aug. 30, 2023

(65) Prior Publication Data

US 2024/0410408 A1 Dec. 12, 2024

(30) Foreign Application Priority Data

Jun. 9, 2023 (TW) .................................. 112121562

(51) Int. Cl.
| | |
|---|---|
| *F16B 13/08* | (2006.01) |
| *F16B 13/06* | (2006.01) |
| *F16B 13/10* | (2006.01) |

(52) U.S. Cl.
CPC ........ *F16B 13/0891* (2013.01); *F16B 13/065* (2013.01); *F16B 13/10* (2021.08)

(58) Field of Classification Search
CPC ........ F16B 13/04; F16B 13/065; F16B 13/08; F16B 13/0816; F16B 13/0825; F16B 13/085; F16B 13/0866; F16B 13/0891; F16B 13/10; F16B 21/125
USPC ......... 411/21, 44, 54, 57.1, 60.1, 70, 75, 76, 411/347, 348
See application file for complete search history.

(56) References Cited

U.S. PATENT DOCUMENTS

| | | | | | |
|---|---|---|---|---|---|
| 3,352,193 | A | * | 11/1967 | Lerich ................. | E21D 21/0026 411/80 |
| 3,552,258 | A | * | 1/1971 | Warner ............... | F16B 13/0891 411/21 |
| 3,669,481 | A | * | 6/1972 | Bergmann ............ | E05B 63/127 411/21 |
| 4,270,434 | A | * | 6/1981 | Bucheli ................. | F16B 13/066 411/21 |
| 4,501,520 | A | * | 2/1985 | Bergner .............. | F16B 13/0833 411/21 |
| 4,656,806 | A | * | 4/1987 | Leibhard ............... | F16B 13/065 52/704 |
| 4,884,931 | A | * | 12/1989 | Revol ................... | F16B 13/063 248/231.91 |

(Continued)

*Primary Examiner* — Nicholas L Foster

(74) *Attorney, Agent, or Firm* — Apex Juris, pllc; Cera Oh

(57) ABSTRACT

An expandable anchoring device includes several openings around a periphery of a tube body. Two opposite ends of the tube body along an axial direction are respectively defined a distal end and a proximal end. Several blocks respectively pass through one of the openings. A length of a distal end side wall of each block along a radial direction is smaller than a length of a proximal end side wall of each block along the radial direction. An expanding member having a tapered portion and a columnar portion is disposed in the tube body and abuts against an inner surface of each block through a columnar surface, hence a side of an outer surface of each block facing the proximal end protrude out of each opening more than another side of the outer surface of each block. A pulling member connected to the expanding member passes through the tube body.

18 Claims, 15 Drawing Sheets

(56) References Cited

U.S. PATENT DOCUMENTS

| | | | | |
|---|---|---|---|---|
| 6,676,346 B1 * | 1/2004 | Frischmann | .......... | F16B 13/065 |
| | | | | 411/57.1 |
| 7,011,281 B2 * | 3/2006 | Guthrie | ................ | A63B 29/024 |
| | | | | 248/925 |
| 7,258,316 B2 * | 8/2007 | Reeves | ................ | A63B 29/024 |
| | | | | 248/231.91 |
| 8,839,591 B2 * | 9/2014 | Guthrie | ............... | E04G 21/3276 |
| | | | | 248/231.91 |
| 10,113,578 B2 * | 10/2018 | Siegmund | ............. | F16B 19/109 |
| 11,446,526 B2 * | 9/2022 | Guthrie | ................. | F16B 13/065 |
| 11,807,499 B2 * | 11/2023 | Guthrie | .............. | F16B 13/0891 |
| 11,852,176 B2 * | 12/2023 | Haeussler | ............. | F16B 13/068 |
| 12,129,152 B2 * | 10/2024 | Guthrie | .............. | F16B 13/0891 |
| 12,129,880 B2 * | 10/2024 | Guthrie | ............. | A62B 35/0068 |
| 2003/0053880 A1 * | 3/2003 | Johansson | ............. | F16B 21/086 |
| | | | | 411/21 |
| 2004/0213633 A1 * | 10/2004 | Guthrie | ................ | A63B 29/024 |
| | | | | 403/367 |
| 2006/0022101 A1 * | 2/2006 | Reeves | .............. | E04G 21/3261 |
| | | | | 248/231.91 |
| 2009/0056267 A1 * | 3/2009 | Reeves | .................... | A62B 1/04 |
| | | | | 52/699 |
| 2013/0298493 A1 * | 11/2013 | Guthrie | .............. | E04G 21/3276 |
| | | | | 52/749.1 |
| 2014/0263903 A1 * | 9/2014 | Ostrobrod | ............. | F16B 7/1409 |
| | | | | 248/222.12 |
| 2016/0186564 A1 * | 6/2016 | Evans | ................ | E21D 21/0033 |
| | | | | 411/21 |
| 2022/0126134 A1 * | 4/2022 | Guthrie | ................ | F16B 13/065 |
| 2022/0226679 A1 * | 7/2022 | Guthrie | ................ | F16B 13/065 |
| 2022/0316512 A1 * | 10/2022 | Wang | ....................... | F16B 35/06 |
| 2024/0025705 A1 * | 1/2024 | Guthrie | ............. | A62B 35/0068 |
| 2024/0124268 A1 * | 4/2024 | Guthrie | .............. | F16B 13/0891 |
| 2025/0012310 A1 * | 1/2025 | Guthrie | .................... | B66C 1/66 |

* cited by examiner

EXPANDABLE ANCHORING DEVICE

BACKGROUND OF THE INVENTION

Technical Field

The present invention relates generally to an anchoring device, and more particularly to an expandable anchoring device.

Description of Related Art

A conventional expandable anchoring device is generally fixed in a bore for anchoring in a detachable manner and is used to be connected to other objects. For example, construction workers, police officers, firefighters, and even the public can fix an object on the wall or the ceiling through the anchoring device, wherein the object could be, but not limited to, a hanging ring, a safety equipment, a wall decoration, a fitness equipment, etc.

U.S. Pat. No. 7,011,281 B2 discloses an expansion bolt 10, wherein an external force is applied on a ring 30 of a cable 12 to pull an inner bearing seat 14 on a middle, so that an outer surface 13 of the inner bearing seat 14 pushes two outer plugs 16, 17 to expand outwards, and finally the two outer plugs 16, 17 tightly abut against a hole wall 64 of a bore 61, thereby achieving the purpose of fixing the expansion bolt 10 in the bore 61. When the expansion bolt 10 is about to be removed, a reverse external force is applied (e.g., hammering a bushing 62 with a tool 65 such as a chisel) to move the inner bearing seat 14 in a direction toward the outer plugs 16, 17, so that the outer plugs 16, 17 are radially moved inwards, and the expansion bolt 10 could be released and removed from the bore 61.

Although the above-mentioned expansion bolt 10 could be fixed in the anchored bore 61, an outer surface of the outer plugs 16, 17 remains parallel to an axial direction of the inner bearing seat 14 when the outer plugs 16, 17 of the expansion bolt 10 are moved radially. As a result, when the outer plugs 16, 17 abut against a peripheral wall of the bore 61, a friction is generated only by the outer plugs 16, 17 being in contact with the hole wall 64 of the bore 61 in a surface-to-surface manner and no other fixing ways for fixing the expansion bolt 10 into the hole wall 64, so that the expansion bolt 10 could not be engaged with the bore 61 more tightly.

BRIEF SUMMARY OF THE INVENTION

In view of the above, the primary objective of the present invention is to provide an anchoring device, wherein when an expanding member drives blocks on a periphery of the expanding member to expand and move outward, a side of the blocks close to a proximal end gradually protrude more than another side of the blocks close to a distal end, so that the blocks are tightly engaged with a hole wall of an anchor hole, thereby achieving a better effect of fixing an expandable anchoring device.

The present invention provides an expandable anchoring device including an outer tube base, a plurality of blocks, an expanding member, and a pulling member. The outer tube base has a tube body. A direction of an axis of the tube body is defined as an axial direction, and a direction perpendicular to and passing through the axis of the tube body is defined as a radial direction. Two opposite ends of the tube body along the axial direction are respectively defined as a distal end and a proximal end. The tube body has an axial hole extending along the axial direction. A periphery of the tube body has a plurality of openings, wherein two opening side walls are respectively provided on two opposite sides of each of the plurality of openings in a direction perpendicular to the radial direction. A distance between the two opening side walls gradually decreases from an inside of the tube body to an outside of the tube body.

The plurality of blocks are respectively disposed in one of the plurality of openings, wherein two block side walls are respectively provided on two opposite sides of each of the plurality of blocks in the direction perpendicular to the radial direction. A distance between the two block side walls of each of the plurality of blocks gradually decreases from the inside of the tube body to the outside of the tube body. A side of each of the plurality of blocks facing the distal end has a distal end side wall, and another side of each of the plurality of blocks opposite to the distal end side wall and facing the proximal end has a proximal end side wall. An inside and an outside of each of the plurality of blocks in the radial direction has an inner surface and an outer surface, respectively. A length of the distal end side wall along the radial direction is defined as a distal end width. A length of the proximal end side wall along the radial direction is defined as a proximal end width. The distal end width is smaller than the proximal end width. A side of the outer surface of each of the plurality of blocks facing the proximal end protrudes out of one of the plurality of the opening more than another side of the outer surface of each of the plurality of blocks facing the distal end.

The expanding member passes through the axial hole and has a tapered portion and a columnar portion that are connected to each other. A diameter of an end of the tapered portion facing the distal end is greater than a diameter of another end of the tapered portion facing the proximal end. The tapered portion has an inclined surface. The columnar portion is connected to the end of the tapered portion facing the distal end and has a columnar surface. At least a part of the columnar surface abuts against the inner surface of each of the plurality of blocks. An end of the pulling member facing the distal end penetrates through the axial hole and is engaged with the expanding member, and another end of the pulling member has a ring.

When the present invention is used, the pulling member is pushed in a direction toward the distal end to drive the expanding member to move toward the distal end along the axial direction, so that the tapered portion moves to the inside of the blocks, and the blocks could be respectively moved inward in the openings. In this way, the inner surface of each of the blocks changes from tightly abutting against the columnar portion to tightly abutting against the tapered portion, so that each of the blocks changes and from the state, in which an outside of each of the blocks close to the proximal end protrudes more out of the corresponding opening, to the state that the outside of each of the blocks is substantially parallel to the outer peripheral edge of the corresponding opening.

When the blocks are retracted into the openings and the expandable anchoring device is about to be fixed on the anchor hole, the outer tube base is inserted into the anchor hole and then the pulling member is pulled to drive the expanding member to move in the direction towards the proximal end, so that the columnar portion is moved to the inside of the blocks to force the blocks to move outward and expand. During the process, the side of the outer surface of each of the blocks facing the proximal end gradually protrudes outward, so that the blocks could be tightly engaged with the hole wall of the anchor hole through the side of the outer surface of the blocks close to the proximal end, thereby achieving a better effect of fixing the expandable anchoring device.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
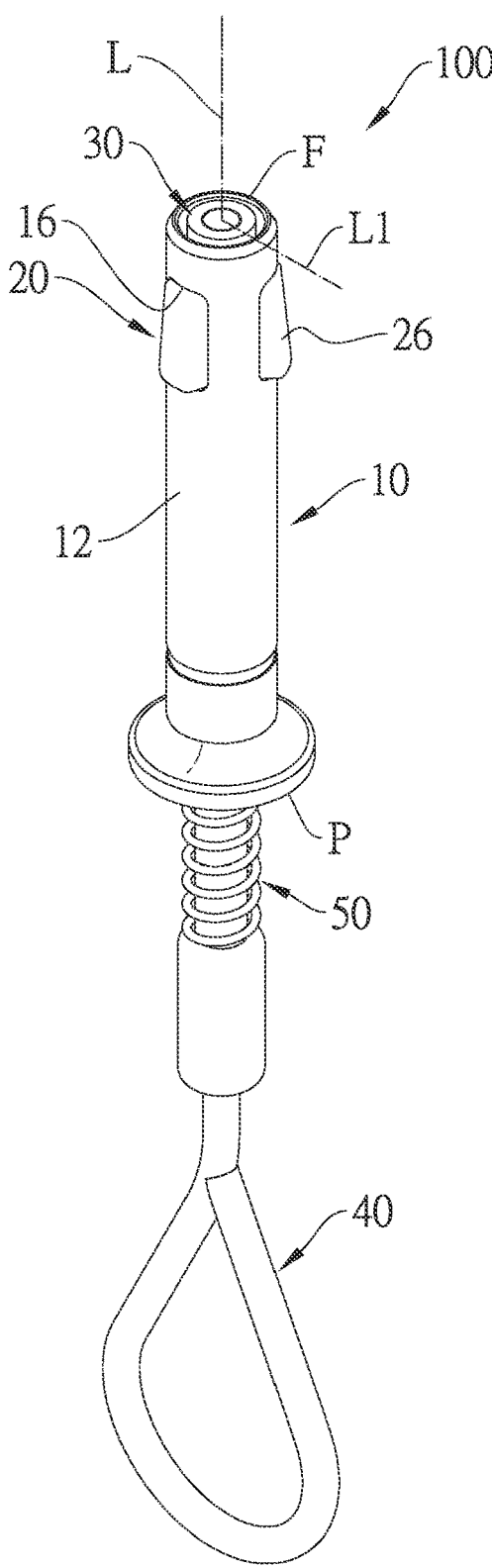
FIG. 1 is a perspective view of the expandable anchoring device according to an embodiment of the present invention.

An expandable anchoring device 100 according to an embodiment of the present invention is illustrated in FIG. 1 to FIG. 6 and includes an outer tube base 10, a plurality of blocks 20, an expanding member 30, a pulling member 40, and a restoring assembly 50.

The outer tube base 10 has a tube body 12. In the current embodiment, the tube body 12 is a cylindrical straight tube body. A direction of an axis of the tube body 12 extending is defined as an axial direction L, and a radial direction perpendicular to and passing through the axis of the tube body 12 is defined as a radial direction L1. Two opposite ends of the tube body 12 along the axial direction L are respectively defined as a distal end F and a proximal end P. A position around the tube body 12 that is close to the axis of the tube body 12 is defined as an inside, and a position around the tube body 12 that is farther away from the axis of the tube body 12 is defined as an outside.

The tube body 12 has an axial hole 14 extending along the axial direction L. A periphery of the tube body 12 has a plurality of openings 16 arranged at intervals around the tube body 12. The openings 16 communicate with the axial hole 14. Two opening side walls 161 are respectively provided on two opposite sides of each of the openings 16 in a direction perpendicular to the radial direction L1. A distance between two outer edges of the two opening side walls 161 along the direction perpendicular to the radial direction L1 is defined as a first width W1. A distance between two inner edges of the two opening side walls 161 along the direction perpendicular to the radial direction L1 is defined as a second width W2. The first width W1 of the opening side walls 161 is smaller than the second width W2 of the opening side walls 161. A distance between the two opening side walls 161 gradually decreases from an inside of the tube body to an outside of the tube body. In the current embodiment, four openings 16 are arranged at equal intervals around a portion of the tube body 12 close to the distal end F. In other embodiments, two openings 16 could be provided on two opposite sides of the tube body 12 in the radial direction L1, or three or more openings 16 could be provided and be arranged at intervals around the tube body 12.

Figure 6:
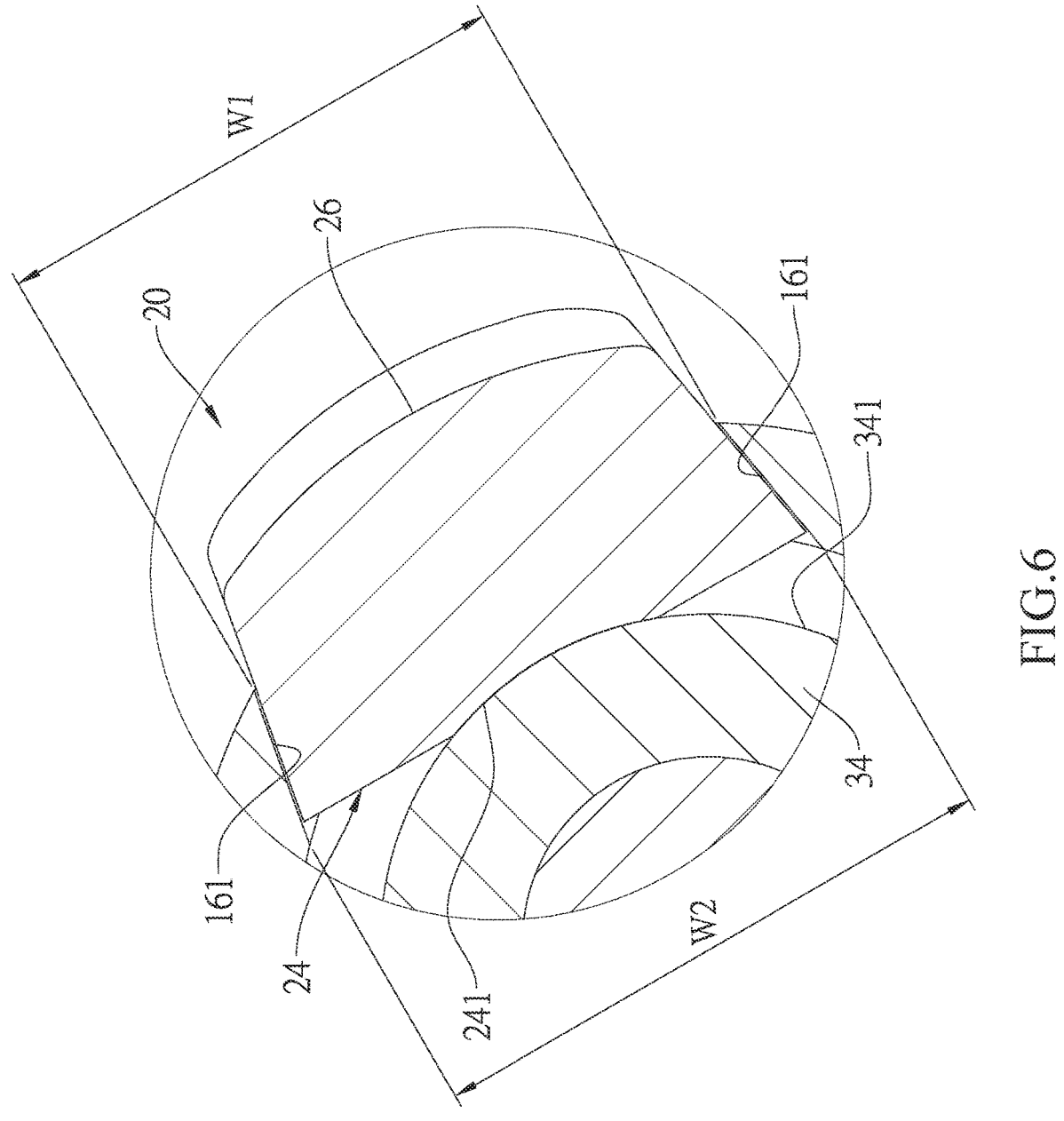
FIG. 6 is an enlarged view of a marked region A2 in FIG. 5.
Figure 7:
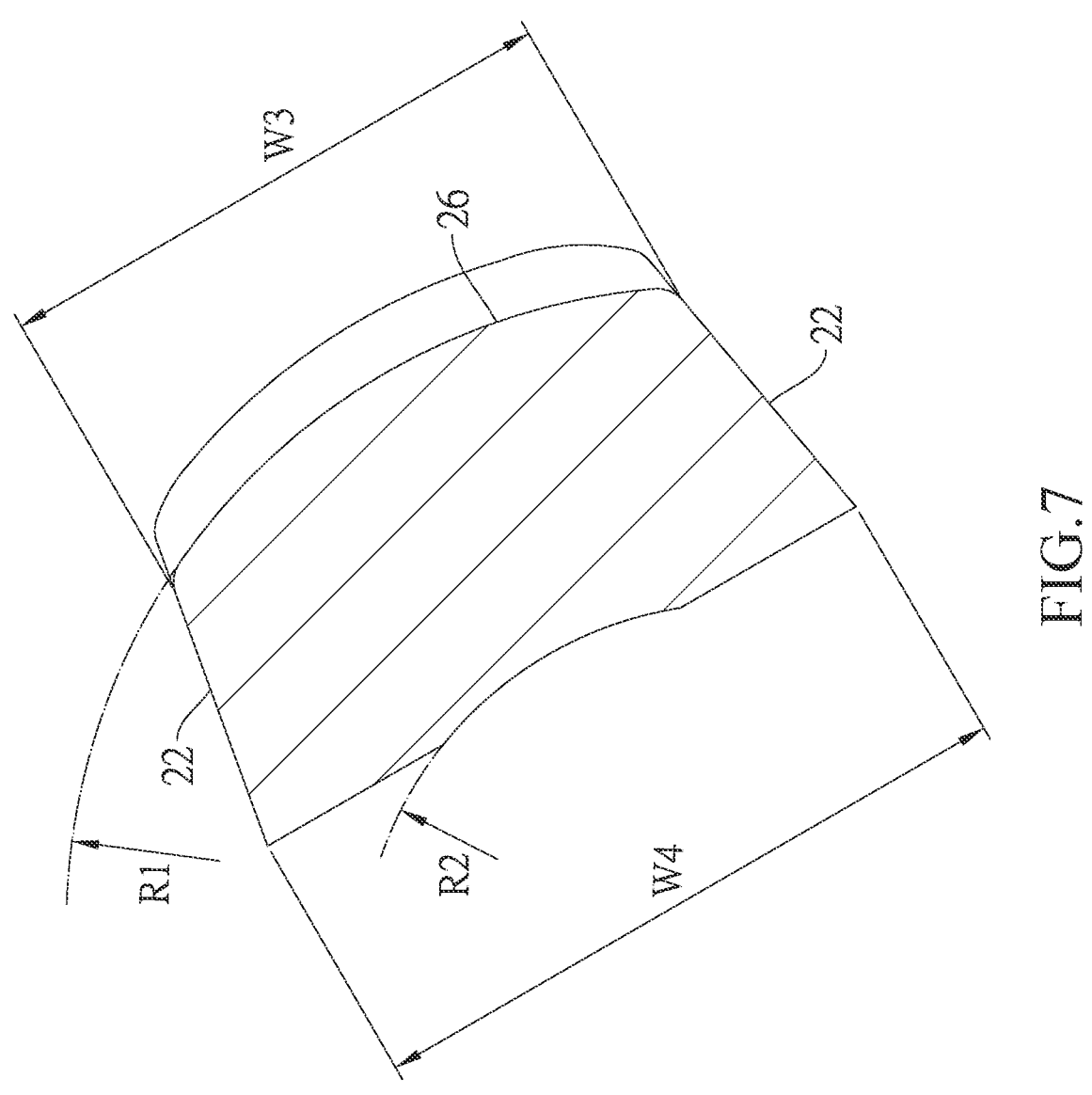
FIG. 7 is a schematic view showing the block in FIG. 6.

The number of the blocks 20 corresponds to the number of the openings 16, and each of the block 20 passes through one of the openings 16. A length of each of the blocks 20 along the radial direction L1 is greater than a distance between an outer peripheral surface of the tube body 12 and a peripheral wall of the axial hole 14 along the radial direction L1. Referring to FIG. 6 and FIG. 7, two block side walls 22 are respectively provided on two opposite sides of each of the blocks 20 in the direction perpendicular to the radial direction L1. A distance between two outer edges of the two block side walls 22 along the direction perpendicular to the radial direction L1 is defined as a third width W3. A distance between two inner edges of the two block side walls 22 along the direction perpendicular to the radial direction L1 is defined as a fourth width W4. The third width W3 of the block side walls 22 is smaller than the first width W1 of the opening side walls 161. The fourth width W4 of the block side walls 22 is greater than the second width W2 of the opening side walls 161. A distance between the two block side walls 22 gradually decreases from the inside of the tube body 12 to the outside of the tube body 12. In this way, when each of the blocks 20 passes through one of the openings 16, each of the blocks 20 could move inward and outward without falling out from the corresponding opening 16 when moving outward.

Figure 8:
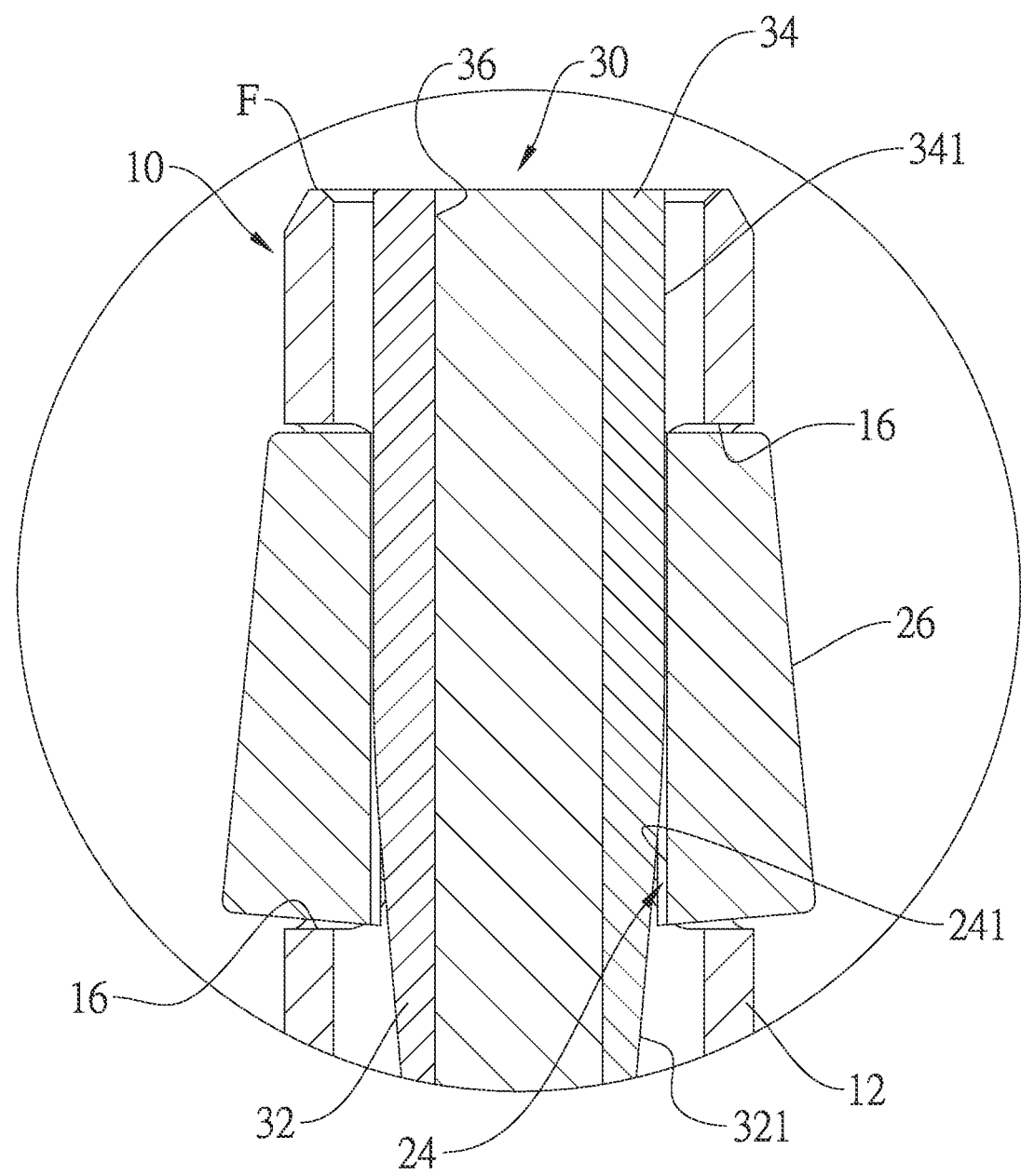
FIG. 8 is an enlarged view of a marked region A1 in FIG. 4.
Figure 9:
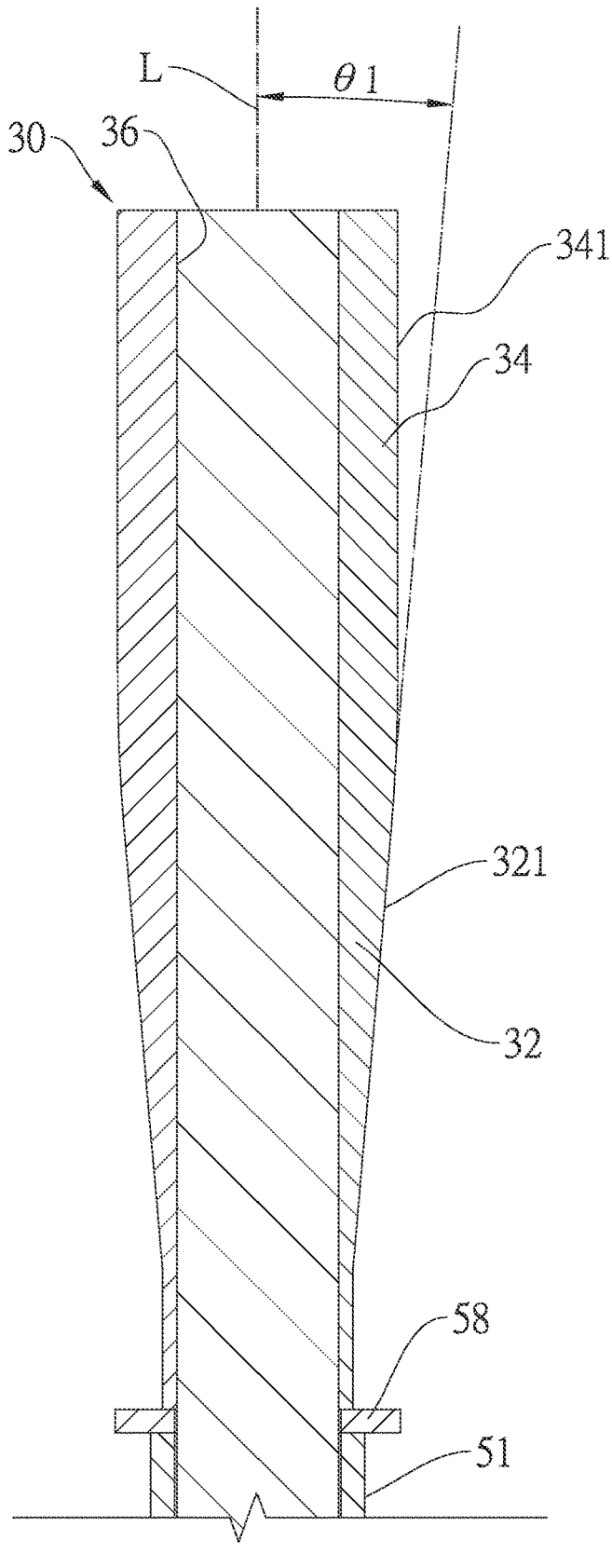
FIG. 9 is an enlarged and sectional schematic view showing a part of the expanding member in FIG. 4.
Figure 10:
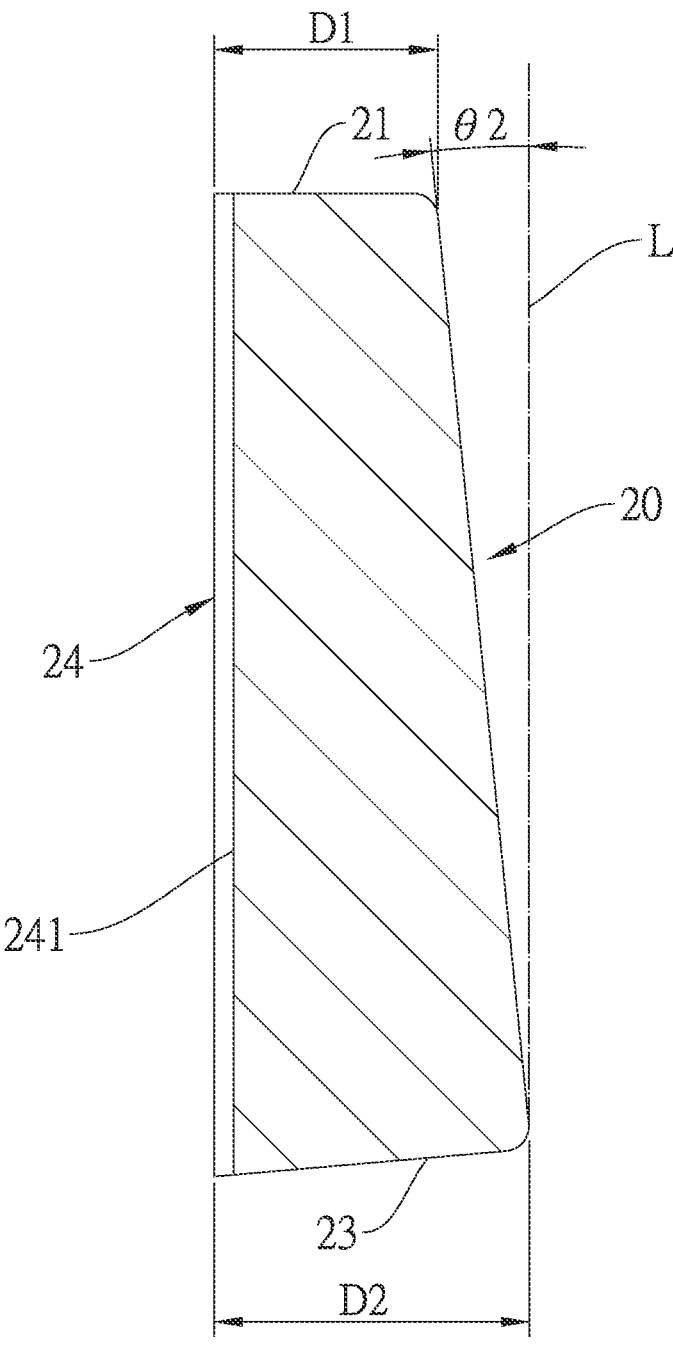
FIG. 10 is a schematic view showing the block in FIG. 4.

Referring to FIG. 8 to FIG. 10, a side of each of the blocks 20 facing the distal end F has a distal end side wall 21, and another side of each of the blocks 20 opposite to the distal end side wall 21 and facing the proximal end P has a proximal end side wall 23. An inside and an outside of each of the blocks 20 in the radial direction L1 has an inner surface 24 and an outer surface 26, respectively. A length of the distal end side wall 21 along the radial direction L1 is defined as a distal end width D1. A length of the proximal end side wall 23 along the radial direction L1 is defined as a proximal end width D2. The distal end width D1 is smaller than the proximal end width D2. A side of the outer surface 26 of each of the blocks 20 facing the proximal end P protrudes out of the corresponding opening 16 more than another side of the outer surface 26 of each of the blocks 20 facing the distal end F.

Figure 4:
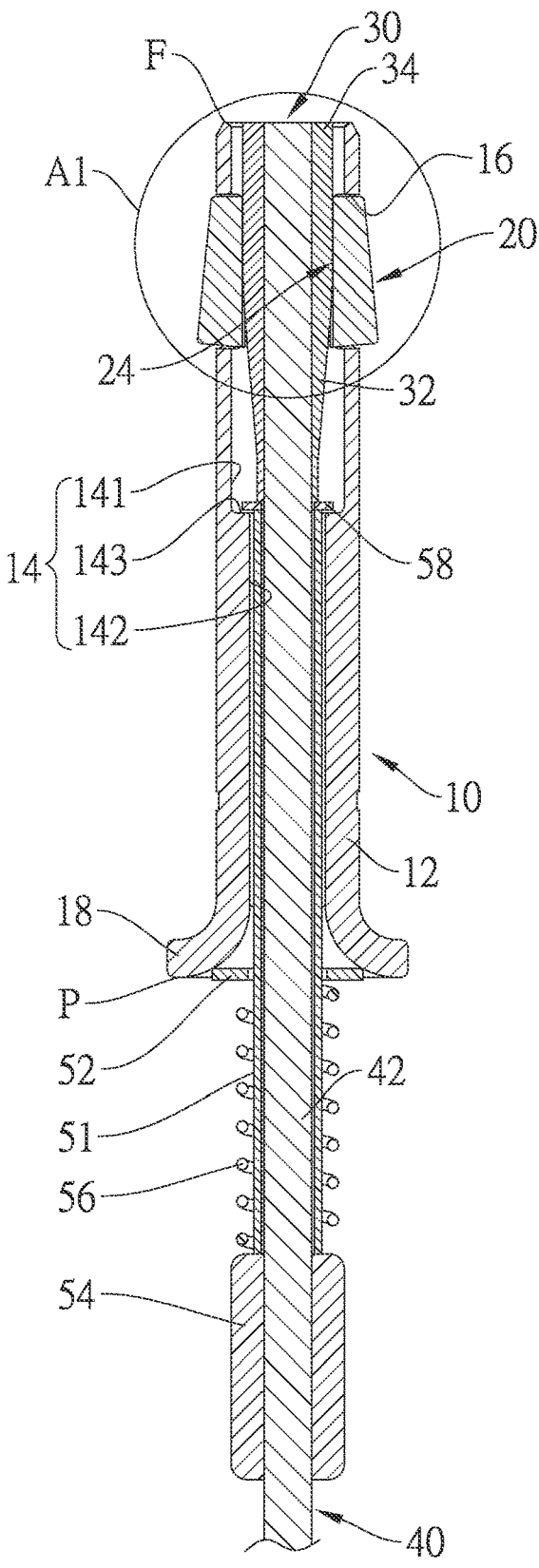
FIG. 4 is a sectional view along the 4-4 line in FIG. 3.

Referring to FIG. 4, FIG. 8, and FIG. 9, the expanding member 30 passes through the axial hole 14 of the outer tube base 10 and is movable toward the distal end F or toward the proximal end P along the axial direction L. The expanding member 30 has a tapered portion 32. A diameter of an end of the tapered portion 32 facing the distal end F is greater than a diameter of another end of the tapered portion 32 facing the proximal end P. A periphery of the tapered portion 32 has an inclined surface 321. The end of the tapered portion 32 facing the distal end F is connected to a columnar portion 34, wherein a periphery of the columnar portion 34 has a columnar surface 341. In the current embodiment, the columnar surface 341 is substantially parallel to the axial direction L. In other embodiments, an angle between the columnar surface 341 and the axial direction L could be smaller than an angle between the inclined surface 321 and the axial direction L. At least a part of the columnar surface 341 of the expanding member 30 abuts against the inner surface 24 of each of the blocks 20.

Referring to FIG. 1 and FIG. 4, the pulling member 40 is a strip-shaped element, wherein an end of the pulling member 40 facing the distal end F penetrates through the axial hole 14 and is engaged with the expanding member 30, and another end of the pulling member 40 away from the expanding member 30 extends out of the proximal end P of the outer tube base 10. When the pulling member 40 is pulled along the axial direction L, the expanding member 30 could be driven to move in the axial hole 14 of the outer tube base 10. More specifically, the pulling member 40 is a steel cable and has a straight section 42 and a ring 44 wound by the steel cable and connected to the straight section 42. A free end of the straight section 42 that is not connected to the ring 44 penetrates through the axial hole 14 of the outer tube base 10 and is engaged with the expanding member 30. The ring 44 is located outside the proximal end P of the outer tube base 10. In other embodiments, the pulling member 40 could also be a rod body, wherein the straight section 42 could be a straight rod body and the ring 44 could be a ring connected to the straight rod body.

Figure 2:
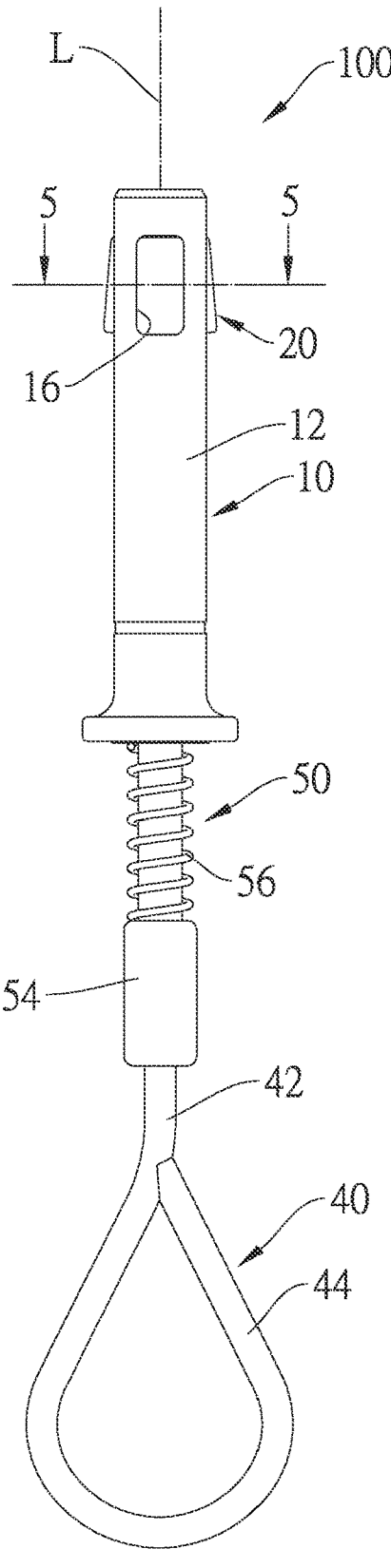
FIG. 2 is a front view of the expandable anchoring device according to the embodiment of the present invention.
Figure 3:
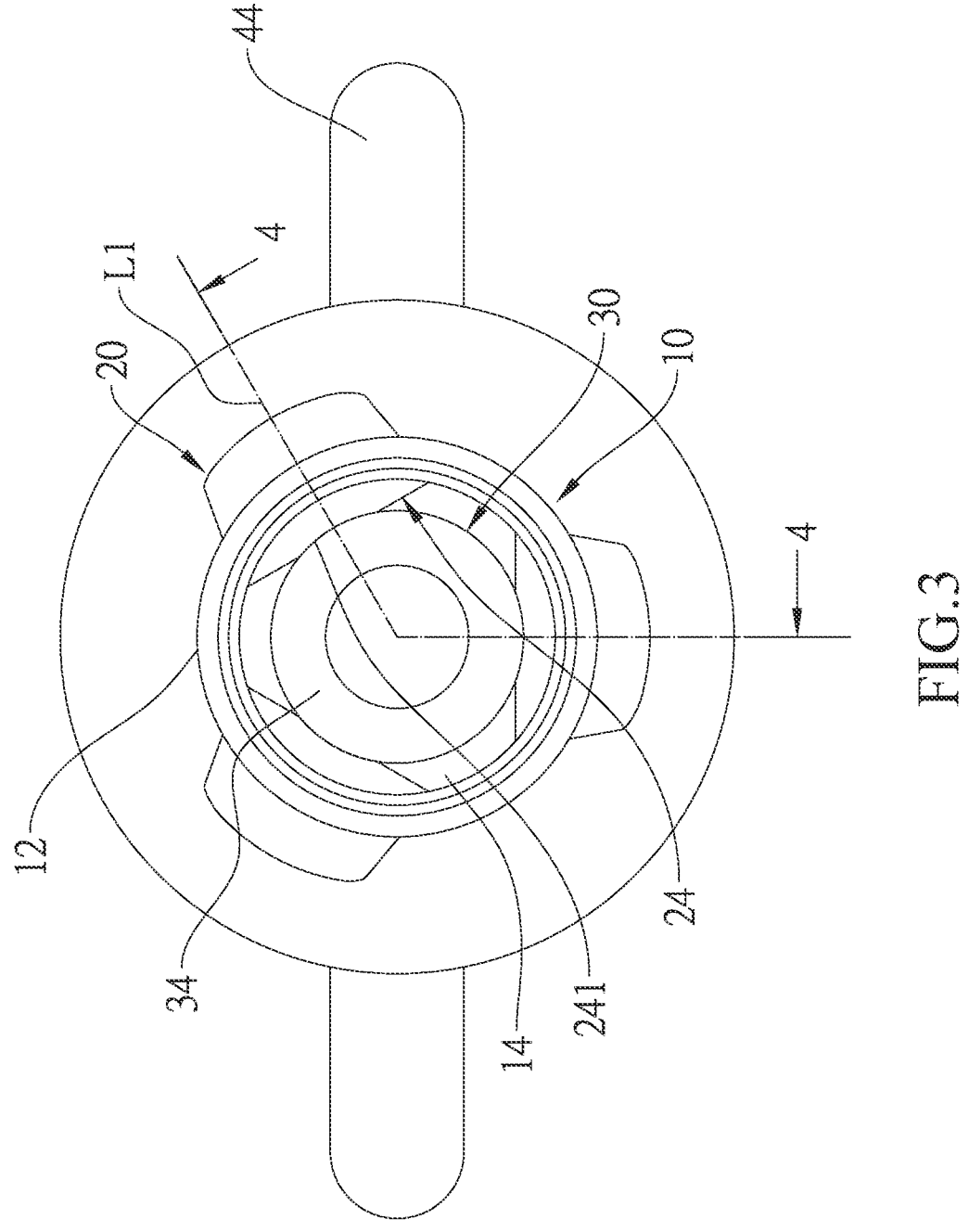
FIG. 3 is a top view of the expandable anchoring device according to the embodiment of the present invention.

Referring to FIG. 2 and FIG. 4, the restoring assembly 50 includes a spring washer 52, a collar 54, a spring 56, a restricting washer 58, and a sleeve 51. The spring washer 52 is ring-shaped and fits around the straight section 42 of the pulling member 40. The spring washer 52 is located outside the axial hole 14 and abuts against the proximal end P of the tube body 12. The collar 54 fits around the straight section 42 of the pulling member 40 for fixing and is separated from the spring washer 52. The spring 56 fits around the straight section 42 of the pulling member 40, wherein two opposite ends of the spring 56 respectively abut against the spring washer 52 and the collar 54. The restricting washer 58 is located in the outer tube base 10. The restricting washer 58 fits around the straight section 42 of the pulling member 40 and abuts against an end of the expanding member 30 facing the proximal end P. The sleeve 51 is a hose and fits around a portion of the straight section 42 located between the restricting washer 58 and the collar 54. In other embodiments, the expandable anchoring device 100 could be provided without the restoring assembly 50 and could be functional by only operating the pulling member 40 to move the expanding member 30.

Figure 11:
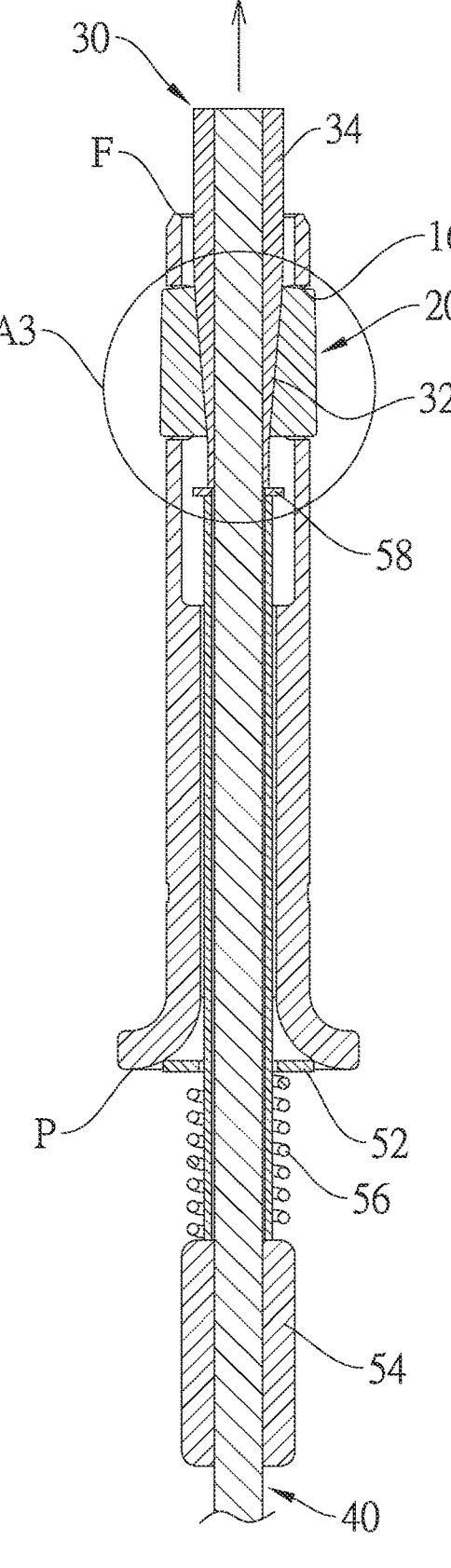
FIG. 11 is a schematic view, showing the pulling member and the expanding member according to the embodiment of the present invention being moved.
Figure 14:
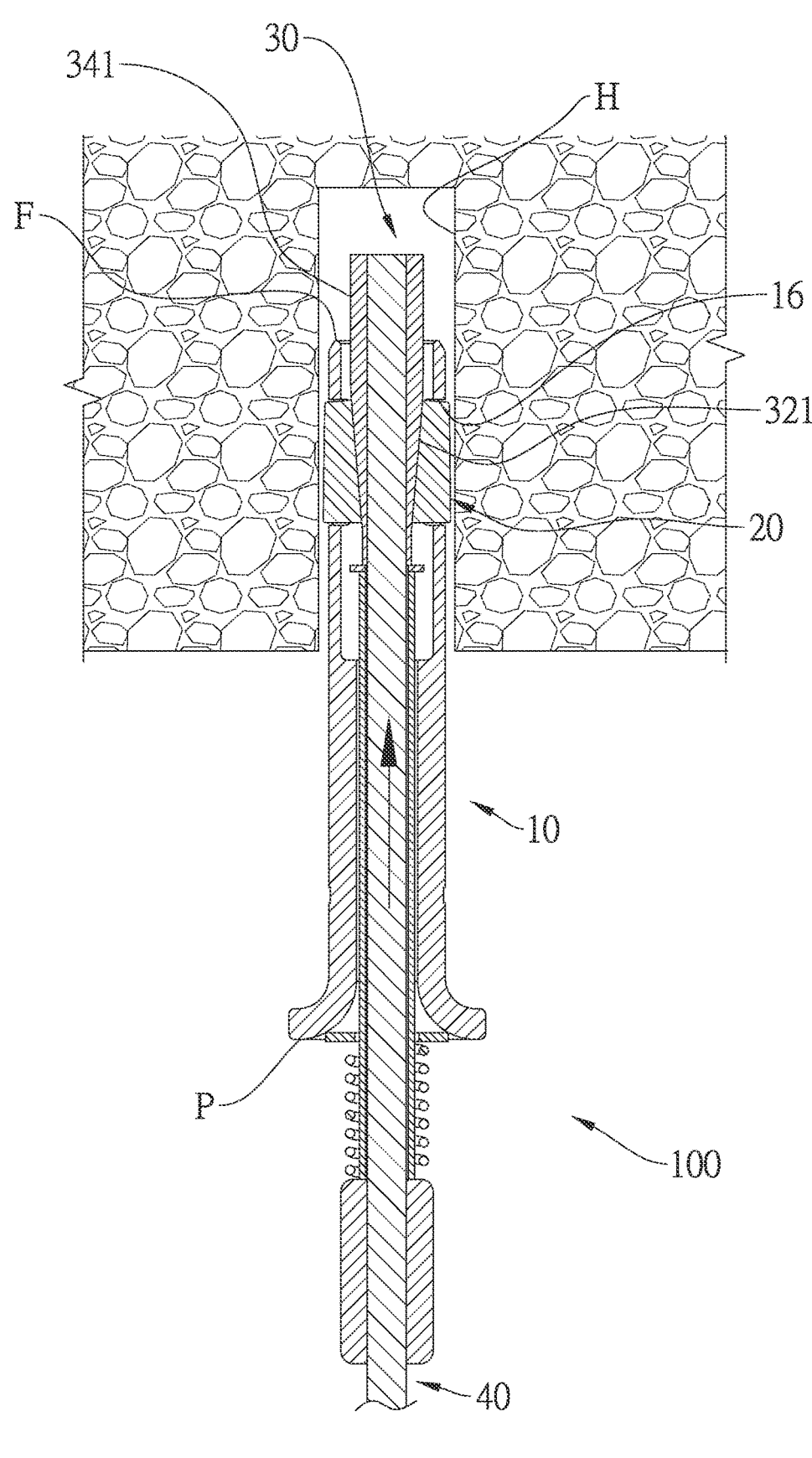
FIG. 14 is a schematic view, showing the expandable anchoring device according to the embodiment of the present invention being inserted into the anchor hole.
Figure 15:
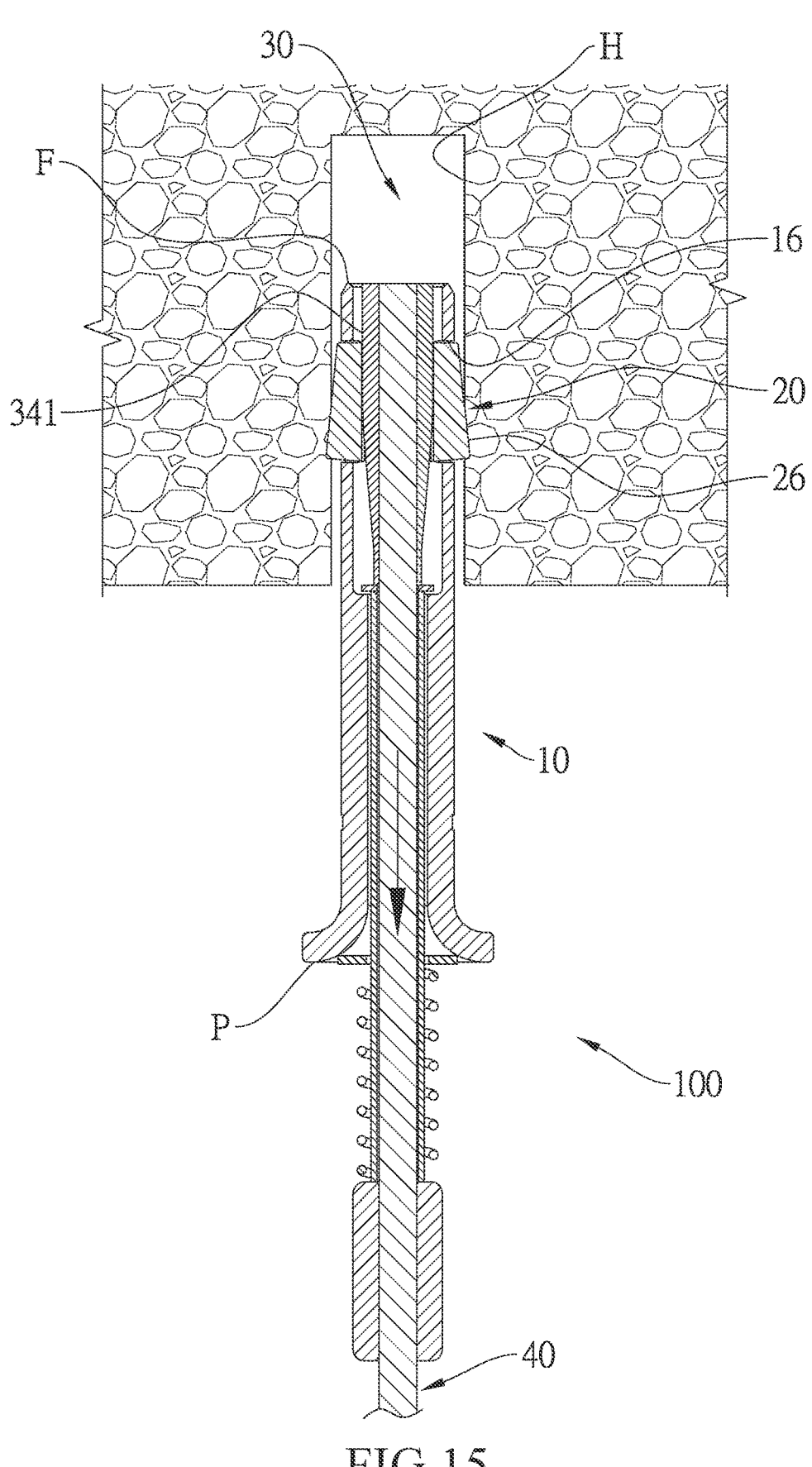
FIG. 15 is a schematic view, showing the expandable anchoring device in FIG. 14 being fixed in the anchor hole.

Referring to FIG. 11, FIG. 14, and FIG. 15, when the expandable anchoring device 100 of the present invention is used, first the pulling member 40 is operated to move the expanding member 30 in a direction toward the distal end F. During the process, the blocks 20 could slide through the inner surface 24 tightly abutting against the inclined surface 321, so that each of the blocks 20 could move inward from a state, in which an outside of each of the blocks 20 extends out of one of the openings 16, to a state that the outer surface 26 of each of the blocks 20 is substantially aligned with an outer peripheral edge of the corresponding opening 16 or slightly protrudes out of the corresponding opening 16. While the pulling member 40 and the expanding member 30 are moved in the direction toward distal end F, the collar 54 compresses the spring 56, so that the spring 56 generates a resilience.

Then a user inserts a side of the outer tube base 10 facing the distal end F into an anchor hole H. By pulling the pulling member 40 relative to the outer tube base 10, or releasing the pulling member 40, the collar 54 and the pulling member 40 are pushed by the spring 56 to restore to an original position through the resilience, so that the expanding member 30 is moved in a direction toward the proximal end P. While the expanding member 30 is moved in the direction toward the proximal end P, the inclined surface 321 of the expanding member 30 gradually pushes the blocks 20 toward the openings 16. Finally, the columnar surface 341 of the expanding member 30 abuts against the inner surfaces 24 of the blocks 20 to force the outside of each of the blocks 20 to protrude out of the corresponding opening 16. The distal end width D1 of each of the blocks 20 is smaller than the proximal end width D2 of each of the blocks 20, so that when the outside of each of the blocks 20 protrudes out of the corresponding opening 16, a side of each of the blocks 20 facing the proximal end P protrudes out of the corresponding opening 16 more than another side of each of the blocks 20 facing the distal end F. In this way, each of the blocks 20 generates an effect similar to a barb, so that the blocks 20 could protrude more tightly out of the outer tube base 10 to be stuck on a hole wall of the anchor hole H, thereby firmly fixing the expandable anchoring device 100 on the anchor hole H.

Referring to FIG. 9 and FIG. 10, a first angle θ1 is formed between the inclined surface 321 of the expanding member 30 and the axial direction L. A second angle θ2 is formed between the outer surface 26 of each of the blocks 20 and the axial direction L. In the current embodiment, the second angle θ2 is approximately equal to the first angle θ1, and an angle θ formed between the inner surface 24 and the outer surface 26 of each of the blocks 20 is equal to the second angle θ2. Referring to FIG. 6 and FIG. 7, the outer surface 26 of each of the blocks 20 is a curved surface protruding outward and has a first radius of curvature R1. Each of the blocks 20 forms a curved portion 241, which matches with a shape of the inclined surface 321 of the expanding member 30, at least on a middle of the inner surface 24. The inner surface 24 of each of the blocks 20 tightly abuts against the inclined surface 321 through the curved portion 241. The curved portion 241 has a second radius of curvature R2. The first radius of curvature R1 is greater than the second radius of curvature R2.

Figure 12:
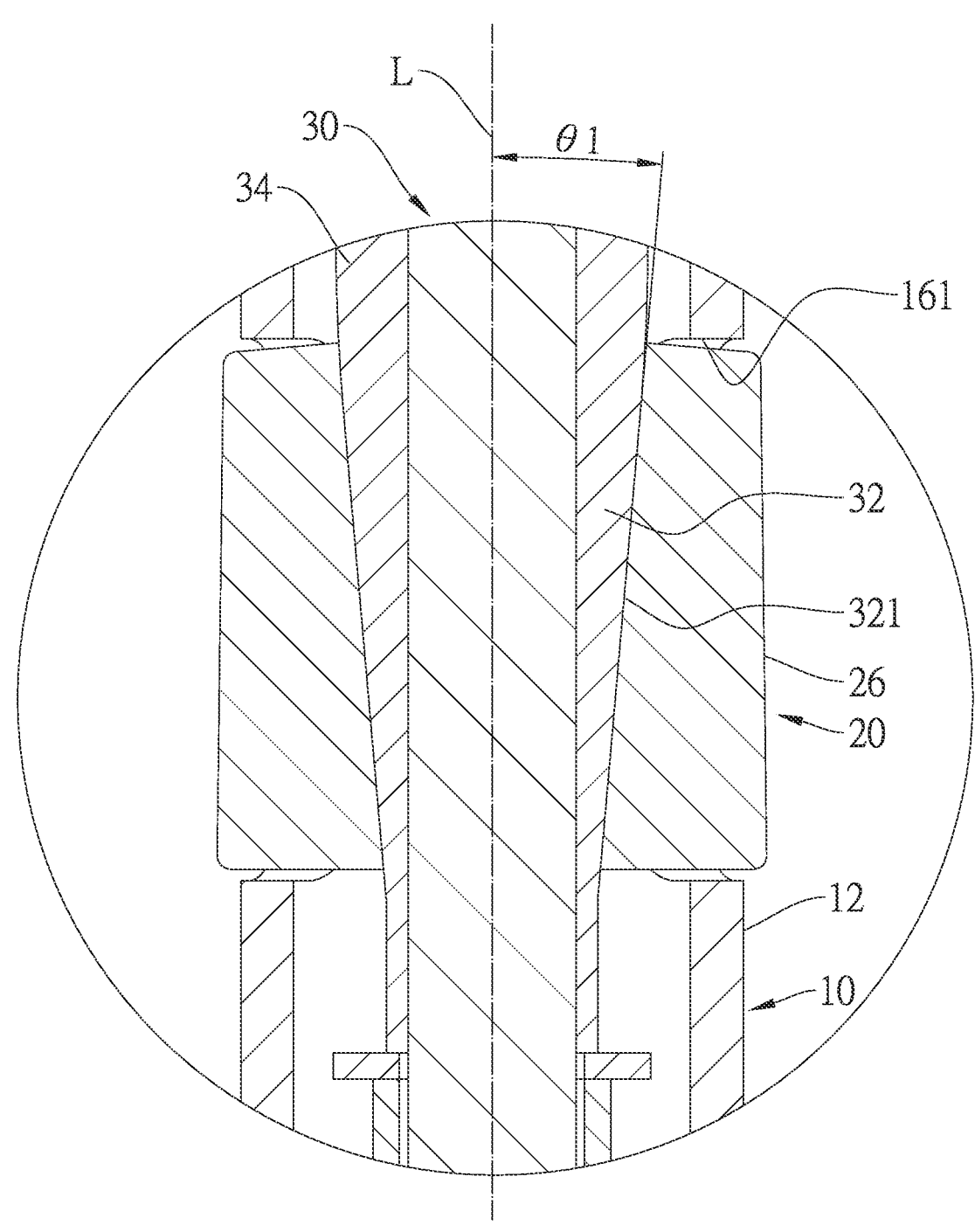
FIG. 12 is an enlarged view of a marked region A3 in FIG. 11.
Figure 13:
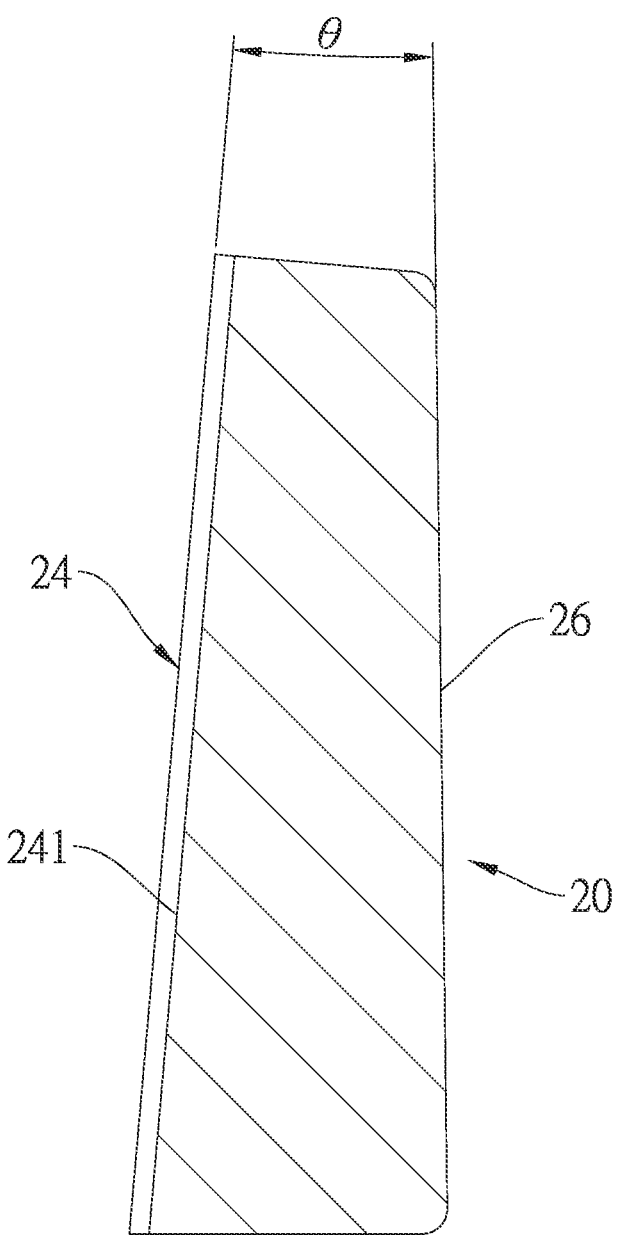
FIG. 13 is a schematic view of the block in FIG. 12.

Referring to FIG. 11 to FIG. 13, in this way, when each of the blocks 20 tightly abuts against the inclined surface 321 of the expanding member 30 through the curved portion 241 of the inner surface 24, the angle θ between the inner surface 24 and the outer surface 26 is approximately equal to the first angle θ1 and the relationship between the angle θ and the first angle θ1 is alternate interior angles, so that the outer surface 26 of each of the blocks 20 is approximately parallel to the axial direction L and is also approximately parallel to the outer peripheral edge of one of the openings 16. In other embodiments, apart from forming the curved portion 241 only on the middle of the inner surface 24 of each of the blocks 20, the whole inner surface 24 of each of the blocks 20 could be a curved portion 241; an absolute value of a difference between the angle θ between the inner surface 24 and the outer surface 26 of each of the blocks 20 and the first angle θ1 could be between 3 degrees and 5 degrees, so that when each of the blocks 20 tightly abuts against the inclined surface 321 of the expanding member 30 through the inner surface 24, an absolute value of a degree of inclination between the outer surface 26 of each of the blocks 20 and the outer peripheral edge of each of the openings 16 is between 3 degrees and 5 degrees and hence the outer surface 26 of each of the blocks 20 and the outer peripheral edge of each of the openings 16 are close to be parallel.

Figure 5:
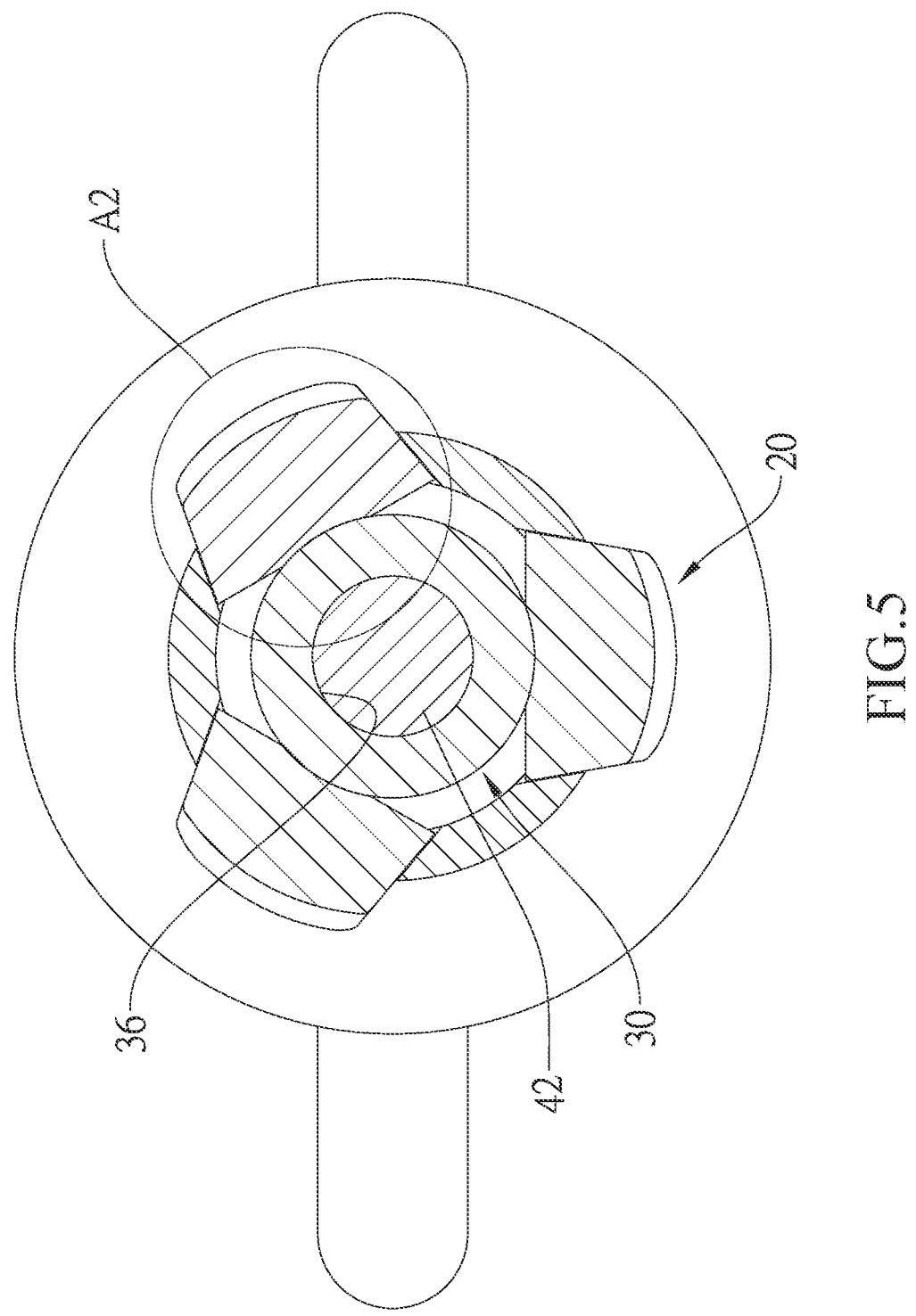
FIG. 5 is a sectional view along the 5-5 line in FIG. 2.

Referring to FIG. 2, FIG. 4, and FIG. 5, the proximal end P of the tube body 12 forms a wide opening portion 18 expanding outward. The spring washer 52 of the restoring assembly 50 abuts against the wide opening portion 18. A side of the axial hole 14 close to the distal end F forms a distal portion 141 with a larger diameter, and another side of the axial hole 14 opposite to the distal portion 141 and close to the proximal end P forms a proximal portion 142 with a smaller diameter. A shoulder portion 143 of the axial hole 14 is connected between the distal portion 141 and the proximal portion 142. The expanding member 30 is located in the distal portion 141. An inside of each of the openings 16 communicates with the distal portion 141 of the axial hole 14. A center of the expanding member 30 has a fitting hole 36 along the axial direction L. The straight section 42 of the pulling member 40 passes through the proximal portion 142 and the free end of the straight section 42 of the pulling member 40 passes through the fitting hole 36 of the expanding member 30, so that the free end of the straight section 42 is compressed by a hole wall of the fitting hole 36 to be engaged with the expanding member 30. A part of the sleeve 51 of the restoring assembly 50 passes through the proximal portion 142. The restricting washer 58 is adapted to abut against the shoulder portion 143 when the expanding member 30 moves toward the proximal end P, thereby preventing the expanding member 30 from moving further toward the proximal end P.

It must be pointed out that the embodiments described above are only some preferred embodiments of the present invention. All equivalent structures which employ the concepts disclosed in this specification and the appended claims should fall within the scope of the present invention.

What is claimed is:

1. An expandable anchoring device, comprising:
an outer tube base having a tube body, wherein a direction of an axis of the tube body is defined as an axial direction, and a direction perpendicular to and passing through the axis of the tube body is defined as a radial direction, two opposite ends of the tube body along the axial direction are respectively defined as a distal end and a proximal end; the tube body has an axial hole extending along the axial direction; a periphery of the tube body has a plurality of openings, wherein two opening side walls are respectively provided on two opposite sides of each of the plurality of openings in a direction perpendicular to the radial direction; a distance between the two opening side walls of each of the plurality of openings gradually decreases from an inside of the tube body to an outside of the tube body;
a plurality of blocks respectively disposed in one of the plurality of openings, wherein two block side walls are respectively provided on two opposite sides of each of the plurality of blocks in the direction perpendicular to the radial direction; a distance between the two block side walls of each of the plurality of blocks gradually decreases from the inside of the tube body to the outside of the tube body; a side of each of the plurality of blocks facing the distal end has a distal end side wall, and another side of each of the plurality of blocks opposite to the distal end side wall and facing the proximal end has a proximal end side wall; an inside and an outside of each of the plurality of blocks in the radial direction has an inner surface and an outer surface, respectively; a length of the distal end side wall along the radial direction is defined as a distal end width; a length of the proximal end side wall along the radial direction is defined as a proximal end width; the distal end width is smaller than the proximal end width; a side of the outer surface of each of the plurality of blocks facing the proximal end protrudes out of one of the plurality of openings more than another side of the outer surface of each of the plurality of blocks facing the distal end;
an expanding member passing through the axial hole and having a tapered portion and a columnar portion that are connected to each other; a diameter of an end of the tapered portion facing the distal end is greater than a diameter of another end of the tapered portion facing the proximal end; the tapered portion has an inclined surface; the columnar portion is connected to the end of the tapered portion facing the distal end and has a columnar surface; at least a part of the columnar surface abuts against the inner surface of each of the plurality of blocks; and
a pulling member, wherein an end of the pulling member facing the distal end penetrates through the axial hole and is engaged with the expanding member, and another end of the pulling member has a ring.

2. The expandable anchoring device as claimed in claim 1, wherein a distance between two outer edges of the two opening side walls along the direction perpendicular to the radial direction is defined as a first width; a distance between two inner edges of the two opening side walls along the direction perpendicular to the radial direction is defined as a second width; the first width is smaller than the second width; a distance between two outer edges of the two block side walls along the direction perpendicular to the radial direction is defined as a third width; a distance between two inner edges of the two block side walls along the direction perpendicular to the radial direction is defined as a fourth width; the third width is smaller than the first width; the fourth width is greater than the second width.

3. The expandable anchoring device as claimed in claim 1, wherein the outer surface of each of the plurality of blocks is a curved surface protruding outward and has a first radius of curvature; a curved portion is formed at least on a middle of the inner surface of each of the plurality of blocks and has a second radius of curvature; the first radius of curvature is greater than the second radius of curvature; the inner surface of each of the plurality of blocks tightly abuts against the inclined surface of the expanding member through the curved portion.

4. The expandable anchoring device as claimed in claim 1, wherein a first angle is formed between the inclined surface of the expanding member and the axial direction; an angle is formed between the inner surface and the outer surface of each of the plurality of blocks; an absolute value of a difference between the first angle and the angle between the inner surface and the outer surface of each of the plurality of blocks is between 3 degrees and 5 degrees; when the inner surface of each of the plurality of blocks tightly abuts against the inclined surface of the expanding member, an absolute value of a degree of inclination between the outer surface of each of the plurality of blocks and an outer peripheral edge of each of the plurality of openings is between 3 degrees and 5 degrees.

5. The expandable anchoring device as claimed in claim 2, wherein a first angle is formed between the inclined surface of the expanding member and the axial direction; an angle is formed between the inner surface and the outer surface of each of the plurality of blocks; an absolute value of a difference between the first angle and the angle between the inner surface and the outer surface of each of the plurality of blocks is between 3 degrees and 5 degrees; when the inner surface of each of the plurality of blocks tightly abuts against the inclined surface of the expanding member, an absolute value of a degree of inclination between the outer surface of each of the plurality of blocks and an outer peripheral edge of each of the plurality of openings is between 3 degrees and 5 degrees.

6. The expandable anchoring device as claimed in claim 3, wherein a first angle is formed between the inclined surface of the expanding member and the axial direction; an angle is formed between the inner surface and the outer surface of each of the plurality of blocks; an absolute value of a difference between the first angle and the angle between the inner surface and the outer surface of each of the plurality of blocks is between 3 degrees and 5 degrees; when the inner surface of each of the plurality of blocks tightly abuts against the inclined surface of the expanding member, an absolute value of a degree of inclination between the outer surface of each of the plurality of blocks and an outer peripheral edge of each of the plurality of openings is between 3 degrees and 5 degrees.

7. The expandable anchoring device as claimed in claim 4, wherein a side of the axial hole close to the distal end forms a distal portion with a larger diameter, and another side of the axial hole opposite to the distal portion and close to the proximal end forms a proximal portion with a smaller diameter; a shoulder portion of the axial hole is connected between the distal portion and the proximal portion; the expanding member is located in the distal portion; an inside of each of the plurality of openings communicates with the distal portion of the axial hole; the pulling member has a straight section, wherein an end of the straight section facing the distal end passes through the proximal portion and a free end of the straight section is engaged with the expanding member, and another end of the straight section is connected to the ring.

8. The expandable anchoring device as claimed in claim 5, wherein a side of the axial hole close to the distal end forms a distal portion with a larger diameter, and another side of the axial hole opposite to the distal portion and close to the proximal end forms a proximal portion with a smaller diameter; a shoulder portion of the axial hole is connected between the distal portion and the proximal portion; the expanding member is located in the distal portion; an inside of each of the plurality of openings communicates with the distal portion of the axial hole; the pulling member has a straight section, wherein an end of the straight section facing the distal end passes through the proximal portion and a free end of the straight section is engaged with the expanding member, and another end of the straight section is connected to the ring.

9. The expandable anchoring device as claimed in claim 6, wherein a side of the axial hole close to the distal end forms a distal portion with a larger diameter, and another side of the axial hole opposite to the distal portion and close to the proximal end forms a proximal portion with a smaller diameter; a shoulder portion of the axial hole is connected between the distal portion and the proximal portion; the expanding member is located in the distal portion; an inside of each of the plurality of openings communicates with the distal portion of the axial hole; the pulling member has a straight section, wherein an end of the straight section facing the distal end passes through the proximal portion and a free end of the straight section is engaged with the expanding member, and another end of the straight section is connected to the ring.

10. The expandable anchoring device as claimed in claim 7, further comprising a restoring assembly, wherein the restoring assembly comprises a spring washer, a collar, and a spring; the spring washer fits around the straight section of the pulling member and abuts against the proximal end of the tube body; the collar fits around the straight section for fixing and is separated from the spring washer; the spring fits arounds the straight section of the pulling member, wherein two opposite ends of the spring respectively abut against the spring washer and the collar.

11. The expandable anchoring device as claimed in claim 8, further comprising a restoring assembly, wherein the restoring assembly comprises a spring washer, a collar, and a spring; the spring washer fits around the straight section of the pulling member and abuts against the proximal end of the tube body; the collar fits around the straight section for fixing and is separated from the spring washer; the spring fit arounds the straight section of the pulling member, wherein two opposite ends of the spring respectively abut against the spring washer and the collar.

12. The expandable anchoring device as claimed in claim 9, further comprising a restoring assembly, wherein the restoring assembly comprises a spring washer, a collar, and a spring; the spring washer fits around the straight section of the pulling member and abuts against the proximal end of the tube body; the collar fits around the straight section for fixing and is separated from the spring washer; the spring fits arounds the straight section of the pulling member, wherein two opposite ends of the spring respectively abut against the spring washer and the collar.

13. The expandable anchoring device as claimed in claim 10, wherein a restricting washer is disposed in the outer tube base; the restricting washer fits around the straight section of the pulling member and abuts against an end of the expanding member facing the proximal end; a sleeve fits around a portion of the straight section located between the restricting washer and the collar.

14. The expandable anchoring device as claimed in claim 11, wherein a restricting washer is disposed in the outer tube base; the restricting washer fits around the straight section of the pulling member and abuts against an end of the expanding member facing the proximal end; a sleeve fits around a portion of the straight section located between the restricting washer and the collar.

15. The expandable anchoring device as claimed in claim 12, wherein a restricting washer is disposed in the outer tube base; the restricting washer fits around the straight section of the pulling member and abuts against an end of the expanding member facing the proximal end; a sleeve fits around a portion of the straight section located between the restricting washer and the collar.

16. The expandable anchoring device as claimed in claim 13, wherein the proximal end of the tube body forms a wide opening portion expanding outward; the spring washer of the restoring assembly abuts against the wide opening portion; the plurality of openings comprise four openings; the plurality of blocks comprise four blocks; the four openings are arranged at equal intervals around the tube body of the outer tube base; each of the four blocks passes through one of the four openings.

17. The expandable anchoring device as claimed in claim 14, wherein the proximal end of the tube body forms a wide opening portion expanding outward; the spring washer of the restoring assembly abuts against the wide opening portion; the plurality of openings comprise four openings; the plurality of blocks comprise four blocks; the four openings are arranged at equal intervals around the tube body of the outer tube base; each of the four blocks passes through one of the four openings.

18. The expandable anchoring device as claimed in claim 15, wherein the proximal end of the tube body forms a wide opening portion expanding outward; the spring washer of the restoring assembly abuts against the wide opening portion; the plurality of openings comprise four openings; the plurality of blocks comprise four blocks; the four openings are arranged at equal intervals around the tube body of the outer tube base; each of the four blocks passes through one of the four openings.

\* \* \* \* \*